(12) United States Patent
Gross et al.

(10) Patent No.: US 8,896,867 B2
(45) Date of Patent: Nov. 25, 2014

(54) METHODS AND SYSTEMS FOR ASSIGNING JOBS TO PRODUCTION DEVICES

(75) Inventors: Eric Michael Gross, Rochester, NY (US); Timothy Wayne Jacobs, Fairport, FL (US); Jack Gaynor Elliot, Penfield, NY (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 77 days.

(21) Appl. No.: 13/610,318

(22) Filed: Sep. 11, 2012

(65) Prior Publication Data

US 2014/0071481 A1     Mar. 13, 2014

(51) Int. Cl.
    *G06K 15/00*     (2006.01)
(52) U.S. Cl.
    USPC ....... 358/1.15; 358/1.12; 358/1.14; 358/1.16; 718/103; 718/104
(58) Field of Classification Search
    USPC ............................... 358/1.15, 1.16
    See application file for complete search history.

(56) References Cited

U.S. PATENT DOCUMENTS

| | | | |
|---|---|---|---|
| 6,993,400 B2 | 1/2006 | Viassolo | |
| 2005/0065830 A1 | 3/2005 | Duke et al. | |
| 2006/0193006 A1* | 8/2006 | Lawrence et al. | 358/1.16 |
| 2008/0144084 A1 | 6/2008 | Rai | |
| 2009/0021775 A1 | 1/2009 | Rai | |
| 2009/0025002 A1 | 1/2009 | Rai | |
| 2012/0154866 A1* | 6/2012 | Chatow et al. | 358/1.15 |

* cited by examiner

*Primary Examiner* — Benny Q Tieu
*Assistant Examiner* — Michael Y Tzeng
(74) *Attorney, Agent, or Firm* — Fox Rothschild LLP

(57) ABSTRACT

A method of assigning a job to a production device may include identifying a queue comprising a plurality of print jobs, identifying a plurality of print production devices capable of processing the plurality of print jobs, determining that one of the identified print production devices is an idle print production device, identifying a top priority print job from the queue, determining a completion time associated with processing the top priority print job by each of the identified print production devices, identifying a fastest print production device, assigning the top priority print job to the fastest print production device, determining whether the fastest print production device is the idle print production device, and in response to determining that the fastest print production device is the idle print production device, sending the top priority print job to the fastest print production device and removing the top priority print job from the queue.

16 Claims, 5 Drawing Sheets

METHODS AND SYSTEMS FOR ASSIGNING JOBS TO PRODUCTION DEVICES

BACKGROUND

Processing systems, such as business or manufacturing processing systems, often store jobs in a queue for processing. The jobs can have vastly different processing requirements and/or functional needs. Assignment of the jobs to processing resources is often accomplished using simple heuristics or policies, or by intuition based on perceived production rates and a notion of which processing resource is most suitable for a given job. However, these perceptions are often inaccurate, which may result in higher job turnaround times or makespan for a set of jobs.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of assigning a job from a queue to a production device in a print production environment may include identifying a queue comprising a plurality of print jobs. Each print job may be associated with a unique priority value. The method may include identifying a plurality of print production devices capable of processing the plurality of print jobs, determining, by a computing device, that one of the identified print production devices is an idle print production device, and identifying a top priority print job from the queue. The top priority print job may be a print job from the plurality of print jobs that is associated with a highest priority value. The method may include determining, by the computing device, a completion time associated with processing the top priority print job by each of the identified print production devices, and identifying a fastest print production device. The fastest print production device may be a print production device from the identified plurality of print production devices that is associated with a shortest completion time for the top priority print job. The method may include assigning, by the computing device, the top priority print job to the fastest print production device, determining whether the fastest print production device is the idle print production device, and in response to determining that the fastest print production device is the idle print production device, sending the top priority print job to the fastest print production device, and removing the top priority print job from the queue.

In an embodiment, a method of assigning a job from a queue to a print production device in a print production environment may include identifying a queue comprising a plurality of print jobs. Each job may be associated with a unique priority value, and the print jobs may be arranged in the queue according to their priority values. The method may include identifying a plurality of print production devices capable of processing the plurality of print jobs, and in response to determining, by a computing device, that one of the identified print production devices is an idle print production device: identifying, by the computing device, a plurality of print job groupings, where each print job grouping may include a plurality of neighboring print jobs in the queue, determining, by the computing device, a plurality of different print job sequences associated with the jobs in the queue by swapping an order of one or more print jobs within one or more print job groupings, determining a completion time for processing each print job sequence, identifying the print job sequence associated with a shortest completion time, and processing the print jobs according to the identified print job sequence.

In an embodiment, a system of assigning a job from a queue to a production device in a print production environment may include a computing device and a computer-readable storage medium in communication with the computing device. The computer-readable storage medium may include one or more programming instructions that, when executed, cause the computing device to identify a queue that includes a plurality of print jobs where each print job is associated with a unique priority value, identify a plurality of print production devices capable of processing the plurality of print jobs, determine that one of the identified print production devices is an idle print production device, and identify a top priority print job from the queue. The top priority print job may be a print job from the plurality of print jobs that is associated with a highest priority value. The computer-readable storage medium may include one or more programming instructions that, when executed, cause the computing device to determine a completion time associated with processing the top priority print job by each of the identified print production devices and identify a fastest print production device. The fastest print production device may be a print production device from the identified plurality of print production devices that is associated with a shortest completion time for the top priority print job. The computer-readable storage medium may include one or more programming instructions that, when executed, cause the computing device to assign the top priority print job to the fastest print production device, determine whether the fastest print production device is the idle print production device, and, in response to determining that the fastest print production device is the idle print production device, send the top priority print job to the fastest print production device, and remove the top priority print job from the queue.

In an embodiment, a system of assigning a print job from a queue to a print production device in a print production environment may include a computing device and a computer-readable storage medium in communication with the computing device. The computer-readable storage medium may include one or more programming instructions that, when executed, cause the computing device to identify a queue comprising a plurality of print jobs, where each print job is associated with a unique priority value, identify a plurality of print production devices capable of processing the plurality of print jobs, determine that one of the identified print production devices is an idle print production device, and identify a highest priority print job. The highest priority print job may be a print job from the plurality of print jobs that is associated with a highest priority value. The computer-readable storage medium may include one or more programming instructions that, when executed, cause the computing device to determine a completion time associated with processing the highest priority print job, and identify a fastest print production device. The fastest print production device may be a print production device from the identified plurality of print production devices that is associated with a shortest completion time for the highest priority print job. The computer-readable storage medium may include one or more programming instructions that, when executed, cause the computing device to assign the highest priority print job to the fastest print production device, determine whether the fastest print production device is the idle print production device, and in response to determining that the fastest print production device is not the idle print production device: determine a completion time associated with processing a next highest priority print job from the plurality of print jobs by each of the identified print production devices that have not been assigned to a print job, assign the next highest priority print job to the print production device having the shortest completion time for processing the next highest priority print job, and repeat the determining a completion time associated with processing a next highest priority print job and the assigning the next highest priority print job to the print production device having the shortest completion time for processing the next highest priority print job until a job from the plurality of print jobs is assigned to the idle print production device.

In an embodiment, a system of assigning a job from a queue to a print production device in a print production environment may include a computing device and a computer-readable storage medium in communication with the computing device. The computer-readable storage medium may include one or more programming instructions that, when executed, cause the computing device to identify a queue comprising a plurality of print jobs. Each job may be associated with a unique priority value, and the print jobs may be arranged in the queue according to their priority values. The computer-readable storage medium may include one or more programming instructions that, when executed, cause the computing device to identify a plurality of print production devices capable of processing the plurality of print jobs, and in response to determining that one of the identified print production devices is an idle print production device: identify a plurality of print job groupings, where each print job grouping includes a plurality of neighboring print jobs in the queue, determine a plurality of different print job sequences associated with the jobs in the queue by swapping an order of one or more print jobs within one or more print job groupings, determine a completion time for processing each print job sequence, identify the print job sequence associated with a shortest completion time, and process the print jobs according to the identified print job sequence.

DETAILED DESCRIPTION

Figure 1:
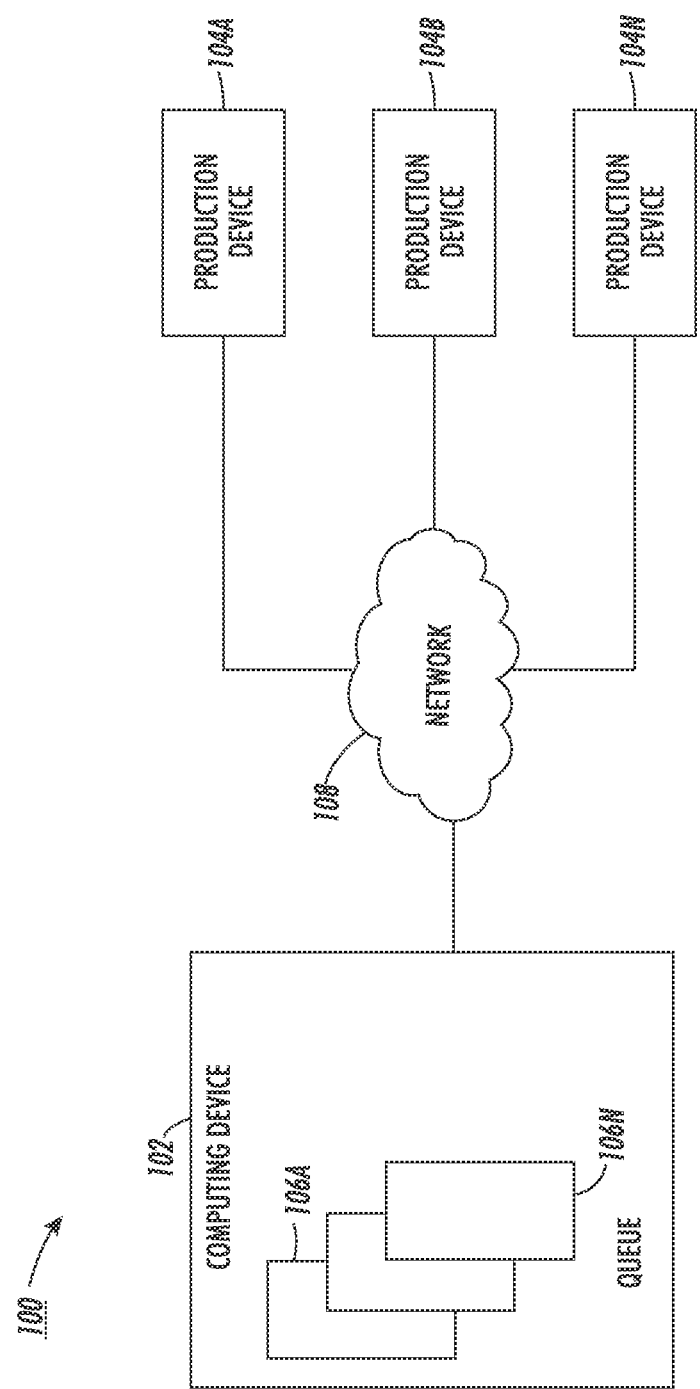
FIG. 1 illustrates a block diagram of a system for assigning a print job to a production device according to an embodiment.

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "job" refers to a logical unit of work that is to be completed for a customer. A job may include one or more jobs from one or more clients. A production system may include a plurality of jobs. Although the disclosed embodiments pertain to document production systems, the disclosed methods and systems can be applied to production systems in general.

A "print job" refers to a job processed in a document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "production device" refers to a physical device that has a processor and/or a storage medium that is used to process at least a portion of a job. For example, in a document production environment, a production device may be a printer, a copier, a collator, a binder, a scanner, a multi-function device and/or the like.

A "production environment" or "production process" refers to an entity having multiple items of equipment to manufacture and/or process items that may be customized based on customer requirements. For example, a vehicle production environment may exist in an automobile assembly plant, where different areas exist to assemble and/or finish portions of the automobile such as the engine, trim, drive train, and other parts. A document production environment includes document production devices, such as printers, cutters, collators and the like. A chemical, pharmaceutical or other process industry production environment may include production devices such as chemical processing units, vessels, heating equipment, mixing equipment and the like. A production environment may be a free standing entity, including one or more production-related devices, or it may be part of a corporation or other entity. Additionally, the production environment may communicate with one or more servers by way of a local area network or a wide area network, such as the Internet or the World Wide Web.

A "queue" refers to a sequence of jobs waiting to be processed. In an embodiment, a queue may be implemented in hardware, software or a combination of hardware and software.

FIG. 1 illustrates a block diagram of a system 100 for assigning a job, such as a print job, to a production device, such as a document production device, according to an embodiment. As illustrated by FIG. 1, the system 100 may include a computing device 102 and one or more production devices 104a-N. The computing device 102 may include one or more queues 106a-N. Each queue 106a-N may be configured to store one or more jobs.

In an embodiment, the computing device 102 may be in communication with the production devices 104a-N via a communication network 108. In various embodiments, the communication network 108 may be a local area network (LAN), a wide area network (WAN), a mobile or cellular communication network, an extranet, an intranet, the Internet and/or the like. In an embodiment, the communication network 108 may provide communication capability between a computing device 102 and the production devices 104a-N. Although FIG. 1 illustrates one computing device 102, it is understood that they system 100 may include more than one computing device within the scope of this disclosure.

In an embodiment, a queue 106a-N may store one or more jobs to be processed by one or more production devices. The jobs may be stored in a queue 106a-N in a certain order or sequence. In an embodiment, jobs may be stored in a queue 106a-N according to the order in which the jobs were received. For example, jobs may be stored in a queue 106a-N according to a first-in-first-out policy, a last-in-first-out policy and/or the like.

In an embodiment, an order of jobs within a queue 106a-N may be based on a priority associated with the jobs. For example, high priority jobs may be positioned near the top of the queue 106a-N and low priority jobs may be positioned near the bottom of the queue regardless of the order in which the jobs are received. A priority may be based on due date, customer importance and/or the like.

In an embodiment, jobs may have different job types, job sizes, setup characteristics and/or the like. A job type refers to a sequence of functions required to process a job from start to finish. For example, in a document production environment, a print job may be printed, cut and collated. The job type associated with this job may be printing, cutting and collating because this is the necessary sequence of functions that must be performed to completely process the job. Additional and/or alternate job types may be used within the scope of this disclosure.

In an embodiment, a setup characteristic refers to a feature of any step in the production process. For example, in a document production system, a printer setup may be dependent on the type of form used. As such, a setup characteristic of a job may be form type. As another example, an insertion operation setup may depend on one or more inserts associated with a job. As such, a setup characteristic of a job may be insert type. As yet another example, in a manufacturing production environment, setup characteristics may be associated with cleaning and/or preparing production resources to process a next product type.

In an embodiment, a job may be capable of being processed by more than one production device. Production devices may operate at different processing rates than other production devices. In an embodiment, production devices may have varying levels of reliability and/or quality levels associated with them. For example, a production device that has been serviced numerous times over the course of a period may be considered less reliable than a production device that has been serviced a fewer number of times during the period.

Figure 2:
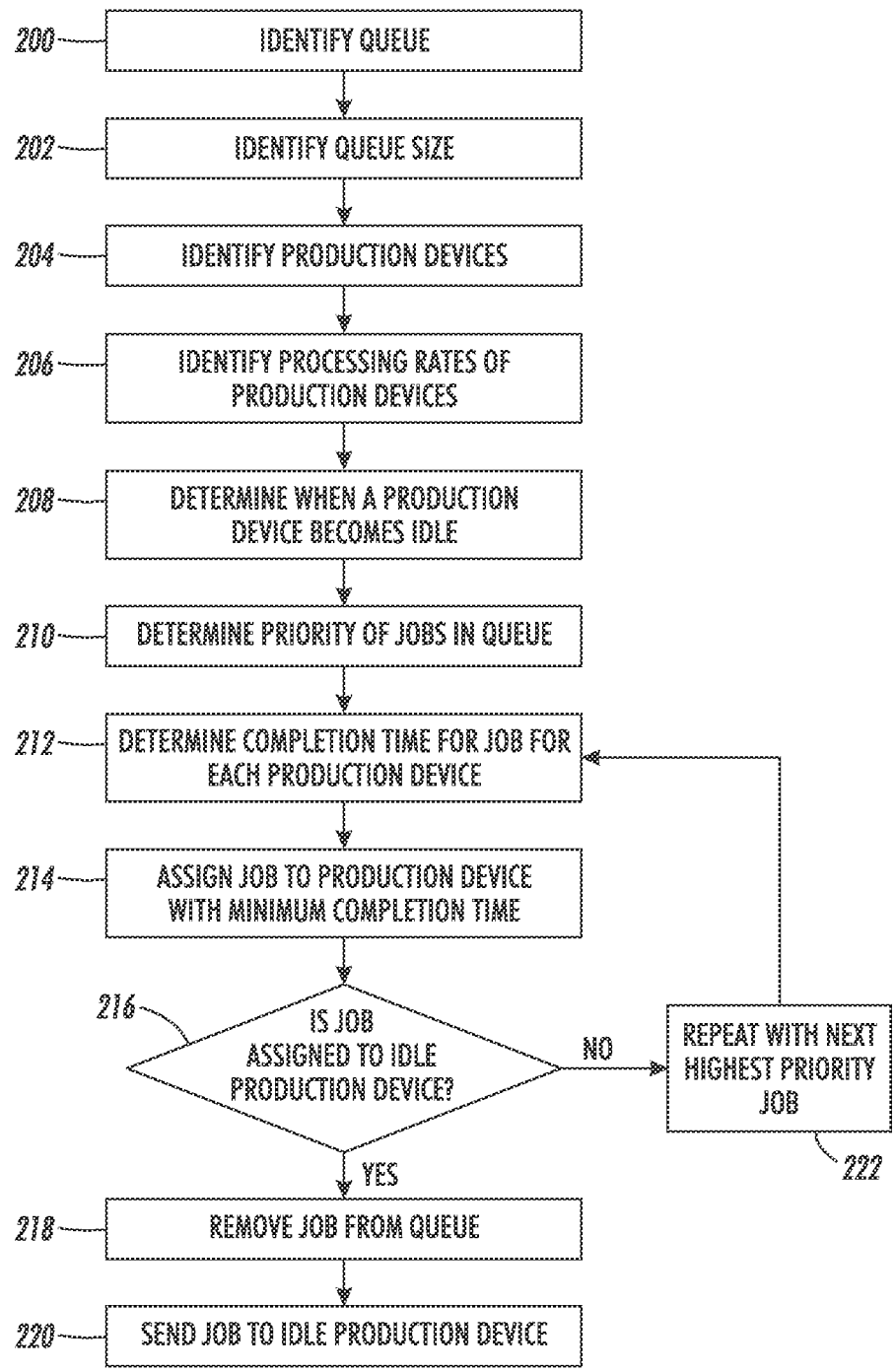
FIGS. 2 and 3 each illustrate a flow chart of an example method of assigning jobs from a queue to production devices according to various embodiments.

FIG. 2 illustrates a flow chart of an example method of assigning jobs from a queue to production devices in order to minimize the processing time of the next job in the queue according to an embodiment. In an embodiment, a job may be assigned to the most suitable production device. Suitability may be a measure of one or more factors such as, for example, amount of time to complete the job, quality of the processed job, likelihood that the job will be completed within a period of time, and/or the like. For example, a production device may be determined to be the most suitable production device if it can process a job in the least amount of time. As another example, a production device may be determined to be the most suitable production device if it has the best likelihood of processing a job from start to finish within a time period. Although suitability will be discussed herein in terms of time to complete a job, it is understood that additional and/or other measures of suitability may be used within the scope of this disclosure.

In an embodiment, a queue may be identified 200, and a size associated with the queue may be identified 202. In an embodiment, a queue size may refer to the number of jobs stored by the queue at a particular time. For example, a queue, Q, may be identified 200, and a size, N, associated with Q may be identified to be '10', meaning that Q is capable of storing up to ten print jobs.

In an embodiment, one or more production devices may be identified 204. Each production device that is capable of processing a print job may be identified 204. For example, production devices that are operational may be identified 204. Production devices that are undergoing repair, maintenance or that are otherwise not operational may not be identified.

In an embodiment, the processing rates associated with one or more of the identified production devices may be identified 206. In an embodiment, a processing rate may be received from a production device. In an alternate embodiment, a processing rate may be received from a database or other storage medium where processing rates of production devices may be stored. For example, three production devices, M1, M2 and M3, may be identified 204. The processing rates for these production devices may be identified 206 as R1, R2 and R3, respectively.

In an embodiment, it may be determined 208 when an identified production device becomes an idle production device. An idle production device may refer to a production device that need not process any job before it is able to begin processing a job from a queue. In contrast, an occupied production device may refer to a production device that must complete one or more jobs prior to processing a job from a queue.

In an embodiment, a production device may transmit a notification to a processor when it becomes an idle production device. In an alternate embodiment, a processor may ping one or more production devices to determine 208 whether the productions devices are idle. A processor may ping a production device at regular intervals or periodically.

In an embodiment, a priority associated with one or more of the jobs in the queue may be determined 210. A priority may indicate an order or precedence in which jobs are to be processed and/or completed. For example, a job associated with a higher priority may be processed in advance of a job associated with a lower priority. In an embodiment, each job in a queue may have a unique priority. A priority may be an alpha-numeric or other identifier. In another embodiment, each job may have no priority, or each job may have the same priority. In this case, the order in which the jobs are processed may be arbitrary or may be based on one or more other job characteristics such as, for example, the time a job was received, job size and/or the like. In an embodiment, a priority may be assigned to a job by whomever submitted the job. In another embodiment, a priority may be assigned to a job by an operator of a production environment. In an embodiment, one or more jobs may be classified as rush jobs and may receive a high priority and a position near the front of the queue.

As an example, jobs J1, J2 and J3 may be considered. J1 may have a priority of '1', J2 may have a priority of '2' and J3 may have a priority of '3'. In this example, '1' may be the highest priority, '2' the next highest priority, and '3' the next highest priority.

In an embodiment, a completion time associated with the highest priority job in a queue may be determined 212 for each identified production device. A completion time may be the time at which the highest priority job in a queue is expected to be completed by a production device. In an embodiment, if a production device is currently processing a job, the remaining time to complete the current job may be considered in determining 212 a completion time.

In an embodiment, the completion time, T, for a job, J, by a production device, M, having a processing rate, R, may be represented by:

$$T = dT + \frac{Jsize}{R} + SetUp(J, M)$$

where:

dT is the estimated time to complete the current job(s) being processed by M,

SetUp(J, M) is the setup time incurred by running J on M, and

Jsize is the size of J

In an embodiment, the setup time of a job may be dependent on the production device and/or the job that the production device processed before the job. For example, if a production device processes a job having the same setup characteristics as the next job to be processed from a queue, then the setup time may be minimal. If, however, the jobs have different setup characteristics, then some setup time may be incurred in order to prepare the production device to process the next job.

For example, suppose that M2 is idle and M1 and M3 are in use when J1, the job in Q that has the highest priority, is evaluated. The estimated completion time, $T_1$, for J1 by M1 may be represented by:

$$T_1 = dT1 + \frac{J1size}{R1} + SetUp(J1, M1),$$

where:

dT1 is the estimated time to complete the current job(s) being processed by M1,

SetUp(J1, M1) is the setup time incurred by running J1 on M1,

J1size is the size of J1

The estimated completion time, $T_2$, for J1 by M2 may be represented by:

$$T_2 = dT2 + \frac{J1size}{R2} + SetUp(J1, M2),$$

where:

dT2 is the estimated time to complete the current job(s) being processed by M2=0 because M2 is not idle and not processing a job, SetUp(J1, M2) is the setup time incurred by running J1 on M2, and J1size is the size of J1

The estimated completion time, $T_3$, for J1 by M3 may be represented by:

$$T_3 = dT3 + \frac{J1size}{R3} + SetUp(J1, M3),$$

where:

dT3 is the estimated time to complete the current job(s) being processed by M3,

SetUp(J1, M3) is the setup time incurred by running J1 on M3, and

J1size is the size of J1

In an embodiment, a processing rate distribution and/or a setup time distribution may be used in lieu of a single processing rate or a setup time, respectively. Using a rate or setup time distribution may yield a distribution of completion time rather than a single estimated completion time. Using distribution information may provide more information from which to make decisions trading performance against risk. For example, a job may be assigned to a production device associated with the most attractive completion time statistics, such as, for example, mean and variance.

In an embodiment, a job may be assigned 214 to the production device associated with the minimum completion time. For example, using the above example, J1 may be assigned 214 to the production device that corresponds to the minimum of $\{T_1, T_2, T_3\}$.

In an embodiment, it may be determined 216 whether a job is assigned to an idle production device or an occupied production device. An idle production devices may refer to a production device that need not process any job before it is able to begin processing a job from a queue. An occupied production device may refer to a production device that must complete one or more jobs prior to beginning processing a job from a queue.

If it is determined 216 that a job is assigned to an idle production device, the top priority job may be removed 218 from the queue, and may be sent 220 to the production device for processing. In an embodiment, the method may be repeated once a production device finishes processing its one or more jobs and becomes an idle production device. For instance, referring to the above example, if T2 is the minimum completion time value, then J1 may be assigned to M2 (an idle production device), M2 may begin processing J1, and J1 may be removed from Q. The method may be repeated if and when M1, M2 and/or M3 become an idle production device.

In an embodiment, if it is determined that a top priority job in a queue is assigned to an occupied production device, then the method may repeated 222 using the job in the queue associated with the next highest priority value and the production devices that are not the production device to which the top priority job is assigned. For example, if T1 is the minimum completion time value, then J1 may be assigned to M1 (an occupied production device). The method may be repeated for J2 for each identified production device. However, the identified production devices may no longer include M1 because J1 has already been assigned to M1. As such, J2 may be assigned to M2 or M3.

In an embodiment, the process may be repeated 222 until a job from the queue is assigned to the idle production device. For example, if J2 is assigned to M3, then J3 may be assigned to M2. In an embodiment, once a job from a queue is assigned to the idle production device, then the process may be repeated for the remaining jobs in the queue once one of the production devices becomes an idle production device. As such, jobs in a queue that are assigned to occupied production devices may not necessarily be processed by such production devices because the process is repeated each time a production device becomes idle. A job that is assigned to an occupied production device may be returned to the queue, and its assignment may be reconsidered when the method is repeated. This is because the state of the system is likely to have changed, and the production device to which the job had been previously assigned may not still be the most suitable production device to process the job.

For instance, using the above example, J1 may be assigned to M1, J2 may be assigned to M3 and J3 may be assigned to M2. Because M2 is the idle production device, it may process J3. Jobs J1 and J2 may not actually be processed by M1 and M3, respectively, because M1 and M3 are occupied production devices and are already processing other jobs. When M1, M2 or M3 becomes an idle production device, the method may be repeated to determine which of the jobs in the queue is to be assigned to it.

Figure 3:
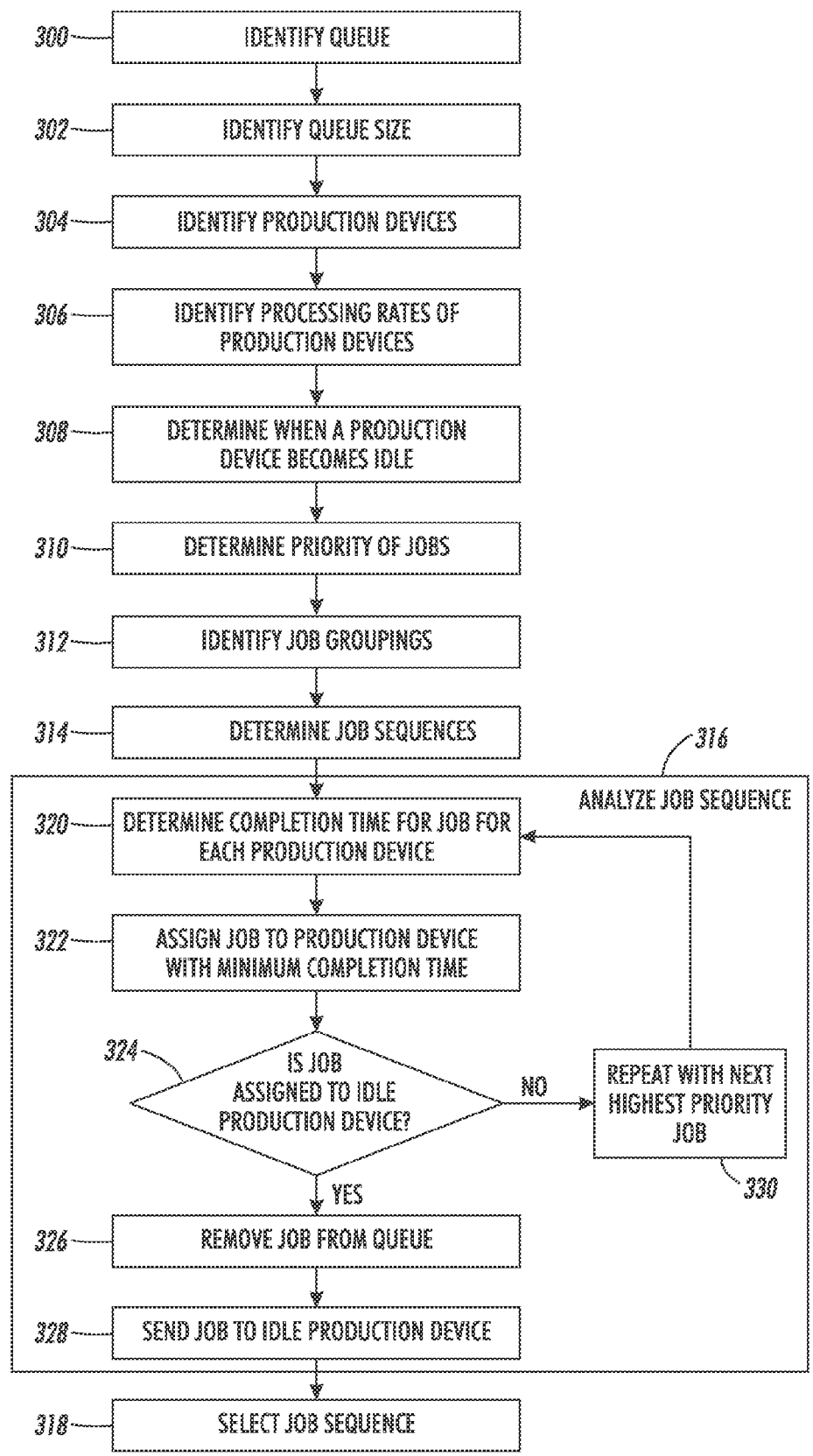

FIG. 3 illustrates a flow chart of an example method of assigning jobs from a queue to production devices in order to minimize the time to complete all of the jobs in the queue. As illustrated by FIG. 3, a queue may be identified 300, and a size associated with the queue may be identified 302.

In an embodiment, one or more production devices may be identified 304. Each production device that is capable of processing a print job may be identified 304. For example, production devices that are operational may be identified. Production devices that are undergoing repair, maintenance or that are otherwise not operational may not be identified.

In an embodiment, the processing rates associated with one or more of the identified production devices may be identified 306. In an embodiment, a processing rate may be received from a production device. In an alternate embodiment, a processing rate may be received from a database or other storage medium where processing rates of production devices may be stored.

In an embodiment, it may be determined 308 when an identified production device becomes an idle production device. An idle production device may refer to a production device that need not process any job before it is able to begin processing a job from a queue. In contrast, an occupied production device may refer to a production device that must complete one or more jobs prior to beginning processing a job from a queue.

In an embodiment, a production device may transmit a notification to a processor when it becomes an idle production device. In an alternate embodiment, a processor may ping one or more production devices to determine 308 whether the productions devices are idle. A processor may ping a production device at regular intervals or periodically.

Figure 4:
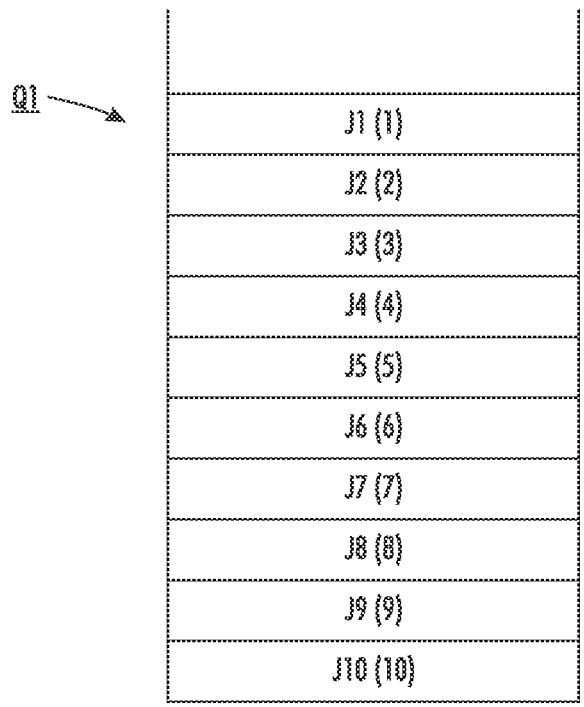
FIG. 4 illustrates an example queue according to an embodiment.

In an embodiment, a priority associated with one or more of the jobs in the queue may be determined 310. FIG. 4 illustrates an example queue according to an embodiment. As illustrated by FIG. 4, queue Q1 may have a size of 10, and may store jobs J1-J10. The number in parenthesis next to the name of each job represents the priority of the corresponding. For purposes of FIG. 4, '1' may be associated with the top priority job, while '10' may be associated with the lowest priority job. As such, job 51 may be the top priority job and may be at the top of Q1.

In an embodiment, one or more job groupings in a queue may be identified 312. A job grouping may be two or more neighboring jobs in a queue. For example, referring to FIG. 4, J1 and J2 may be identified as job grouping. Similarly, J1, J2 and J3 may be identified as a job grouping, or J2 and J3 may be identified as a job grouping. Additional and/or alternate job groupings may be identified as part of this disclosure. In an embodiment, each job may only be a part of one job grouping at a time. For example, a job grouping having J1 and J2 may not be identified with a job grouping that includes J2 and J3.

Figure 5:
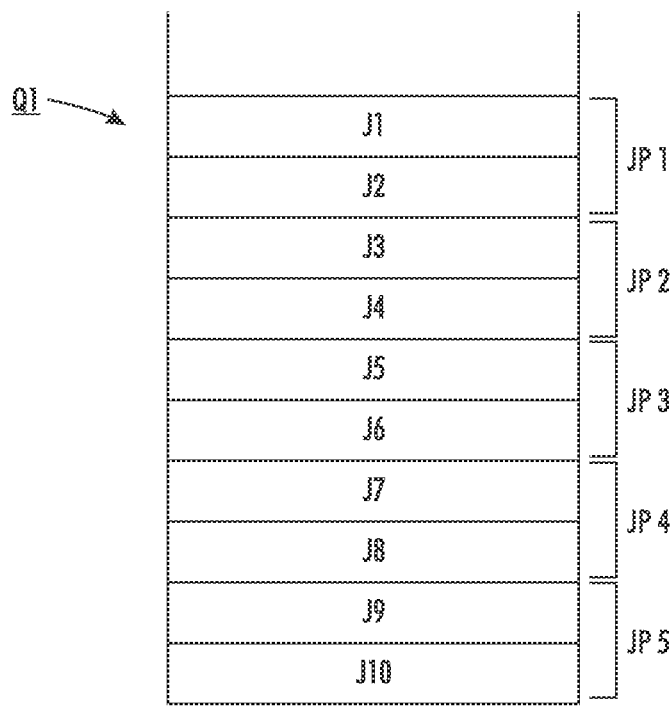
FIG. 5 illustrates example job pairs according to an embodiment.

In an embodiment, a number of identified job groupings may be determined by dividing the number of jobs in a queue by the number of jobs in a job grouping. For example, a job grouping may include two jobs. Referring to FIG. 4, Q1 holds ten jobs, so five job groupings may be identified 312 (i.e., 10 jobs/2). FIG. 5 illustrates example job pairs that correspond to the jobs in Q1 illustrated in FIG. 4.

In an embodiment, one or more different job sequences may be determined 314. A job sequence refers to the order of jobs within a queue. In an embodiment, a job sequence may be determined by swapping the order of one or more jobs within one or more job groupings. For example, referring to FIG. 5, an example job sequence may be the job sequence illustrated by FIG. 5—{J1, J2, J3, J4, J5, J6, J7, J8, J9, J10}. In an embodiment, swapping J1 and J2 may create another example job sequence—{J2, J1, J3, J4, J5, J6, J7, J8, J9, J10}.

In an embodiment, the total number of job sequences may be equal to $x^y$, where x represents the number of jobs within a job grouping, and y represents the number of job groupings in a job sequence. For example, referring to FIG. 5, the total number of job sequences for the jobs in queue Q1 may be equal to $2^5 = 32$. As another example, if a job grouping includes three jobs, the total number of job sequences for the jobs in queue Q1 may be equal to $(3!)^3 * 2^1 = 342$.

In an embodiment, each job sequence may be analyzed 316 and the job sequence associated with the lowest total completion time may be selected 318. Analyzing 316 a job sequence may include, determining 320 a completion time associated with a first job in the job sequence for each identified production device. A first job may be a job from the plurality of jobs in a queue that is positioned at the top of the queue. A completion time may be the time at which the highest priority job in a queue is expected to be completed by a production device. In an embodiment, if a production device is currently processing a job, the remaining time to complete the current job may be considered in determining 320 a completion time.

In an embodiment, the completion time, T, for a job, J, by a production device, M, having a processing rate, R, may be represented by:

$$T = dT + \frac{Jsize}{R} + SetUp(J, M)$$

where:
dT is the estimated time to complete the current job(s) being processed by M,
SetUp(J, M) is the setup time incurred by running Jon M, and
Jsize is the size of J In an embodiment, the setup time of a job may be dependent on the production device and/or the job that the production device processed before the job. For example, if a production device processes a job having the same setup characteristics as the next job to be processed from a queue, then the setup time may be minimal. If, however, the jobs have different setup characteristics, then some setup time may be incurred in order to prepare the production device to process the next job.

In an embodiment, a job may be assigned 322 to a production device associated with the minimum completion time. In an embodiment, it may be determined 324 whether a job is assigned to an idle production device or an occupied production device. If it is determined that a job is assigned to an idle production device, the job may be removed 326 from the queue and the job may be sent 328 to the production device for processing. The method may be repeated once a production device finishes processing its one or more jobs and becomes an idle production device.

In an embodiment, if it is determined that a job in a queue is assigned to an occupied production device, then the method may repeated 330 on the next job in the queue and the production devices that are not the production device to which the top priority job is assigned.

In an embodiment, the process may be repeated 330 until a job from the job sequence is assigned to the idle production device. In an embodiment, once a job from a job sequence is assigned to the idle production device, then the process may be repeated for the remaining jobs in the job sequence once one of the production devices becomes an idle production device. As such, jobs in a job sequence that are assigned to occupied production devices may not necessarily be processed by such production devices because the process is repeated each time a production device becomes idle. A job that is assigned to an occupied production device may be returned to the job sequence, and its assignment may be reconsidered when the method is repeated. This is because the state of the system is likely to have changed, and the production device to which the job had been previously assigned may not still be the most suitable production device to process the job.

As an example, two cases may be considered, each with a queue of ten jobs that have exponentially distributed sizes. For Case 1, the set of job sizes in order of priority is {267, 266, 24, 200, 144, 238, 141, 226, 36, 15}. For Case 2, the set of job sizes in order of priority is {142, 198, 14, 150, 107, 27, 96, 52, 110, 63}.

In an embodiment, there may be two production devices that can operate at rates of 3 and 10 units per hour. 100% uptime may be assumed. Table 1 illustrates the results of the total completion time from start to finish of the set of ten jobs. The column "First Available Production Device" processes the job on the production device that is first available. If two production devices are available at the same time, the faster production device may be selected. The column "First Expected Completion" represents the process described in this disclosure by FIG. 2. The final column represents the same process with the addition of paired swapping so as to consider makespan reduction as described in this disclosure by FIG. 3.

TABLE 1

| Case | First Available Processor | First Expected Completion | First Expected Completion with Paired Switching |
|---|---|---|---|
| Case 1 | 163.7 time units | 130.5 time units | 119.9 time units |
| Case 2 | 86 time units | 81 time units | 74.73 time units |

As illustrated by Table 1, for Case 1, the results for First Expected Completion (130.5 time units) is an approximately 20% reduction of the result for the First Available Processor (163.7 time units), and the results for First Expected Completion with Paired Switching (130.5 time units) is approximately a 27% reduction of the result from the First Available Processor, and an approximate 8% reduction of the result from the First Expected Completion.

As illustrated by Table 1, for Case 2, the results for First Expected Completion (81 time units) is an approximate 6% reduction of the result for the First Available Processor (86 time units), and the results for First Expected Completion with Paired Switching (74.73 time units) is approximately a 13% reduction of the result from the First Available Processor, and an approximate 8% reduction of the result from the First Expected Completion.

Figure 6:
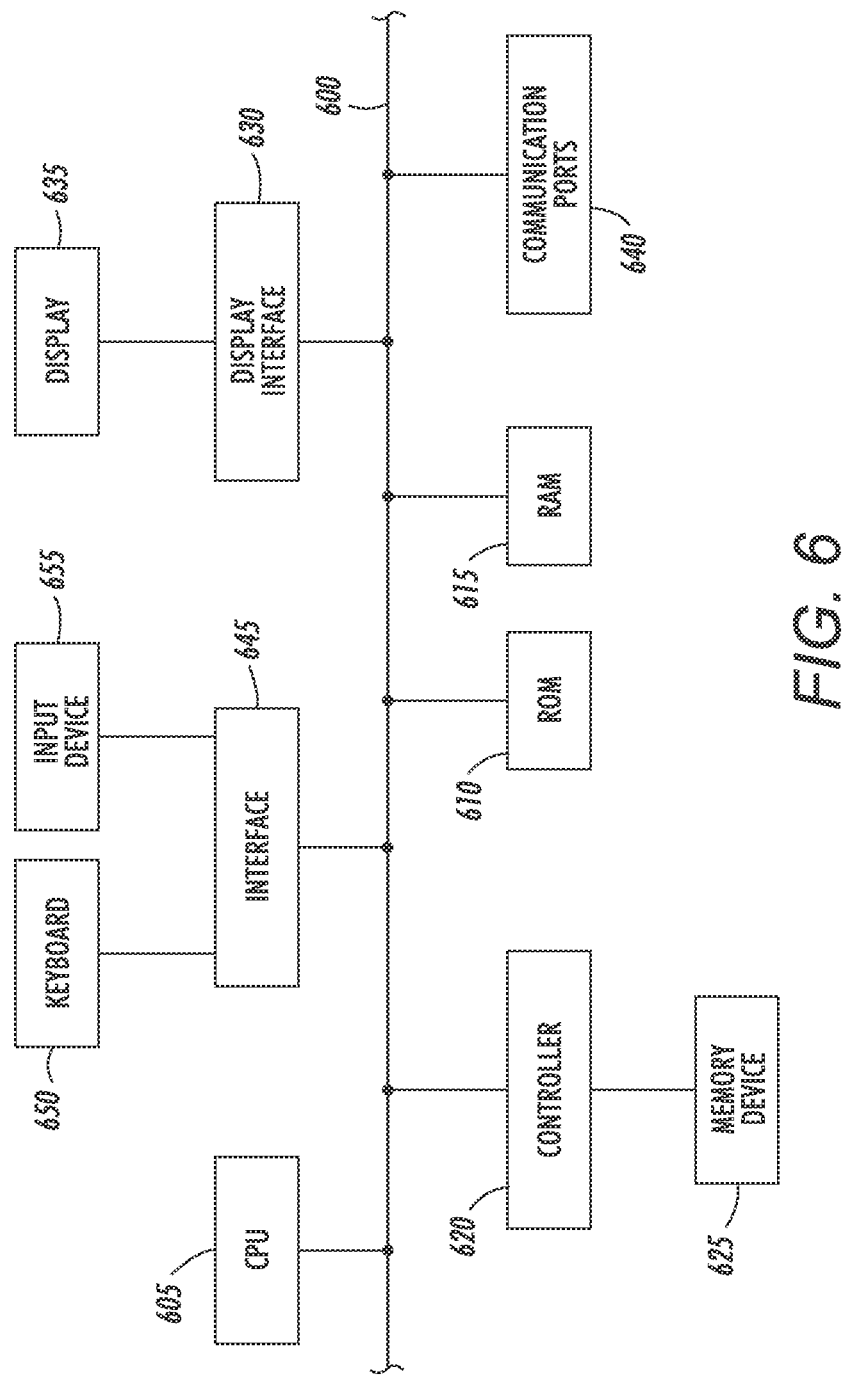
FIG. 6 illustrates a block diagram of hardware that may be used to contain or implement program instructions according to an embodiment.

FIG. 6 depicts a block diagram of hardware that may be used to contain or implement program instructions. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of assigning a job from a queue to a production device in a print production environment, the method comprising:

identifying a queue comprising a plurality of print jobs, wherein each print job is associated with a unique priority value;

identifying a plurality of print production devices capable of processing the plurality of print jobs;

determining, by a computing device, that one of the identified print production devices is currently an idle print production device;

identifying a top priority print job from the queue, wherein the top priority print job is a print job from the plurality of print jobs that is associated with a highest priority value;

determining, by the computing device, a completion time associated with processing the top priority print job by each of the identified print production devices by, for each identified print production device:
  estimating an amount of time for the print production device to complete one or more print jobs that the print production device is currently processing,
  determining a processing time associated with processing the top priority job by the production device by:
    determining a size associated with the top priority print job,
    determining a processing rate associated with the print production device, and
    dividing the size by the processing rate,
  determining a setup time associated with processing the top priority job by the production device, and
  summing the amount of time, the processing time and the setup time;
identifying a fastest print production device, wherein the fastest print production device is a print production device from the identified plurality of print production devices that is associated with a shortest completion time for the top priority print job;
assigning, by the computing device, the top priority print job to the fastest print production device;
determining whether the fastest print production device is the idle print production device; and
in response to determining that the fastest print production device is the idle print production device:
  sending the top priority print job to the fastest print production device, and
  removing the top priority print job from the queue.

2. A method of assigning a print job from a queue to a print production device in a print production environment, the method comprising:
identifying a queue comprising a plurality of print jobs, wherein each print job is associated with a unique priority value;
identifying a plurality of print production devices capable of processing the plurality of print jobs;
determining, by a computing device, that one of the identified print production devices is currently an idle print production device;
identifying a highest priority print job, wherein the highest priority print job is a print job from the plurality of print jobs that is associated with a highest priority value;
determining, by a computing device, a completion time associated with processing the highest priority print job by, for each identified print production device:
  estimating an amount of time for the print production device to complete one or more print jobs that the print production device is currently processing,
  determining a processing time associated with processing the highest priority job by the print production device by:
    determining a size associated with the highest priority print job,
    determining a processing rate associated with the print production device, and
    dividing the size by the processing rate,
  determining a setup time associated with processing the highest priority print job by the print production device, and
  summing the amount of time, the processing time and the setup time;
identifying a fastest print production device, wherein the fastest print production device is a print production device from the identified plurality of print production devices that is associated with a shortest completion time for the highest priority print job;
assigning, by the computing device, the highest priority print job to the fastest print production device;
determining whether the fastest print production device is the idle print production device; and
in response to determining that the fastest print production device is not the idle print production device:
  determining a completion time associated with processing a next highest priority print job from the plurality of print jobs by each of the identified print production devices that have not been assigned to a print job,
  assigning the next highest priority print job to the print production device having the shortest completion time for processing the next highest priority print job, and
  repeating the determining a completion time associated with processing a next highest priority print job and the assigning the next highest priority print job to the print production device having the shortest completion time for processing the next highest priority print job until a job from the plurality of print jobs is assigned to the idle print production device.

3. The method of claim 2, wherein determining a completion time associated with processing a next highest priority print job comprises, for each identified print production device:
estimating an amount of time for the print production device to complete one or more print jobs that the print production device is currently processing;
determining a processing time associated with processing the next highest priority print job by the print production device;
determining a setup time associated with processing the next highest priority print job by the print production device; and
summing the amount of time, the processing time and the setup time.

4. The method of claim 3, wherein determining a processing time comprises:
determining a size associated with the next highest priority print job;
determining a processing rate associated with the print production device; and
dividing the size by the processing rate.

5. A method of assigning a job from a queue to a print production device in a print production environment, the method comprising:
identifying a queue comprising a plurality of print jobs, wherein each job is associated with a unique priority value, wherein the print jobs are arranged in the queue according to their priority values;
identifying a plurality of print production devices capable of processing the plurality of print jobs; and
in response to determining, by a computing device, that one of the identified print production devices is currently an idle print production device:
  identifying, by the computing device, a plurality of print job groupings, wherein each print job grouping comprises a plurality of neighboring print jobs in the queue,
  determining, by the computing device, a plurality of different print job sequences associated with the jobs in the queue by:
    swapping an order of one or more print jobs within one or more print job groupings, determining a job number representing a number of print jobs within a print job grouping,
determining a print job grouping number representing a number of print job groupings associated with the plurality of print jobs, and
determining a number of print job sequences equal to the job number raised to the print job grouping number,
determining a completion time for processing each print job sequence,
identifying the print job sequence associated with a shortest completion time, and
processing the print jobs according to the identified print job sequence.

6. The method of claim 5, wherein identifying a plurality of print job groupings comprises:
determining a job number representing a number of print jobs within a print job grouping; and
identifying a plurality of print job groupings from the plurality of print jobs in the queue, wherein a plurality of identified print job groupings comprises a number of print jobs equal to the job number.

7. The method of claim 5, wherein determining a completion time for processing each print job sequence comprises:
determining a completion time associated with processing a first print job by each of the identified print production devices, wherein the first print job is a print job from the plurality of print jobs that is located at a top of the queue,
assigning the first print job to a fastest print production device, wherein the fastest print production device is a print production device from the identified plurality of print production devices that is associated with a shortest completion time for the first print job,
determining whether the fastest print production device is the idle print production device, and
in response to determining that the fastest print production device is the idle print production device:
sending the first print job to the fastest print production device, and
removing the first print job from the queue.

8. The method of claim 5, wherein determining a completion time for processing each print job sequence comprises:
determining a completion time associated with processing a first print job by each of the identified print production devices, wherein the first print job is a print job from the plurality of print jobs that is located at a top of the queue,
assigning the first print job to a fastest print production device, wherein the fastest print production device is a print production device from the identified plurality of print production devices that is associated with a shortest completion time for the first print job,
determining whether the fastest print production device is the idle print production device,
in response to determining that the fastest print production device is not the idle print production device:
determining a completion time associated with processing a next job from the queue by each of the identified print production devices that have not been assigned to a print job,
assigning the next job to the print production device having the shortest completion time for processing the next print job, and
repeating the determining a completion time associated with processing a next print job and the assigning the next print job to the print production device having the shortest completion time for processing the next print job until a print job from the plurality of print jobs is assigned to the idle print production device.

9. A system of assigning a job from a queue to a production device in a print production environment, the system comprising:
a computing device; and
a non-transitory computer-readable storage medium in communication with the computing device, wherein the computer-readable storage medium comprises one or more programming instructions that, when executed, cause the computing device to:
identify a queue comprising a plurality of print jobs, wherein each print job is associated with a unique priority value,
identify a plurality of print production devices capable of processing the plurality of print jobs,
determine that one of the identified print production devices is currently an idle print production device,
identify a top priority print job from the queue, wherein the top priority print job is a print job from the plurality of print jobs that is associated with a highest priority value,
determine a completion time associated with processing the top priority print job by each of the identified print production devices by, for each identified print production device:
estimating an amount of time for the print production device to complete one or more print jobs that the print production device is currently processing;
determining a processing time associated with processing the to priority job by the production device by:
determining a size associated with the to priority print job,
determining a processing rate associated with the print production device, and
dividing the size by the processing rate;
determining a setup time associated with processing the top priority job by the production device; and
summing the amount of time, the processing time and the setup time;
identify a fastest print production device, wherein the fastest print production device is a print production device from the identified plurality of print production devices that is associated with a shortest completion time for the top priority print job,
assign the top priority print job to the fastest print production device,
determine whether the fastest print production device is the idle print production device, and
in response to determining that the fastest print production device is the idle print production device:
send the top priority print job to the fastest print production device, and
remove the top priority print job from the queue.

10. A system of assigning a print job from a queue to a print production device in a print production environment, the system comprising:
a computing device; and
a non-transitory computer-readable storage medium in communication with the computing device, wherein the computer-readable storage medium comprises one or more programming instructions that, when executed, cause the computing device to:
identify a queue comprising a plurality of print jobs, wherein each print job is associated with a unique priority value, identify a plurality of print production devices capable of processing the plurality of print jobs, determine that one of the identified print production devices is currently an idle print production device, identify a highest priority print job, wherein the highest priority print job is a print job from the plurality of print jobs that is associated with a highest priority value, determine a completion time associated with processing the highest priority print job by each of the identified print production devices by, for each identified print production device:

estimating an amount of time for the print production device to complete one or more print jobs that the print production device is currently processing, determining a processing time associated with processing the highest priority job by the print production device by:

determining a size associated with the highest priority print job, determining a processing rate associated with the print production device, and dividing the size by the processing rate, determining a setup time associated with processing the highest priority print job by the print production device, and summing the amount of time, the processing time and the setup time;

identify a fastest print production device, wherein the fastest print production device is a print production device from the identified plurality of print production devices that is associated with a shortest completion time for the highest priority print job, assign the highest priority print job to the fastest print production device, determine whether the fastest print production device is the idle print production device, and in response to determining that the fastest print production device is not the idle print production device:

determine a completion time associated with processing a next highest priority print job from the plurality of print jobs by each of the identified print production devices that have not been assigned to a print job, assign the next highest priority print job to the print production device having the shortest completion time for processing the next highest priority print job, and repeat the determining a completion time associated with processing a next highest priority print job and the assigning the next highest priority print job to the print production device having the shortest completion time for processing the next highest priority print job until a job from the plurality of print jobs is assigned to the idle print production device.

11. The system of claim 10, wherein the one or more programming instructions that, when executed, cause the computing device to determine a completion time associated with processing a next highest priority print job comprise one or more programming instructions that, when executed, cause the computing device to, for each identified print production device:

estimate an amount of time for the print production device to complete one or more print jobs that the print production device is currently processing;

determine a processing time associated with processing the next highest priority print job by the print production device;

determine a setup time associated with processing the next highest priority print job by the print production device; and sum the amount of time, the processing time and the setup time.

12. The system of claim 11, wherein the one or more programming instructions that, when executed, cause the computing device to determine a processing time comprise one or more programming instructions that, when executed, cause the computing device to:

determine a size associated with the next highest priority print job;

determine a processing rate associated with the print production device; and divide the size by the processing rate.

13. A system of assigning a job from a queue to a print production device in a print production environment, the system comprising:

a computing device; and a non-transitory computer-readable storage medium in communication with the computing device, wherein the computer-readable storage medium comprises one or more programming instructions that, when executed, cause the computing device to:

identify a queue comprising a plurality of print jobs, wherein each job is associated with a unique priority value, wherein the print jobs are arranged in the queue according to their priority values, identify a plurality of print production devices capable of processing the plurality of print jobs, and in response to determining that one of the identified print production devices is currently an idle print production device:

identify a plurality of print job groupings, wherein each print job grouping comprises a plurality of neighboring print jobs in the queue, determine a plurality of different print job sequences associated with the jobs in the queue by:

swapping an order of one or more print jobs within one or more print job groupings, determining a job number representing a number of print jobs within a print job grouping, determining a print job grouping number representing a number of print job groupings associated with the plurality of print jobs, and determining a number of print job sequences equal to the job number raised to the print job grouping number, determine a completion time for processing each print job sequence, identify the print job sequence associated with a shortest completion time, and process the print jobs according to the identified print job sequence.

14. The system of claim 13, wherein the one or more programming instructions that, when executed, cause the computing device to identify a plurality of print job groupings comprise one or more programming instructions that, when executed, cause the computing device to:

determine a job number representing a number of print jobs within a print job grouping; and identify a plurality of print job groupings from the plurality of print jobs in the queue, wherein a plurality of identified print job groupings comprises a number of print jobs equal to the job number.

15. The system of claim 13, wherein the one or more programming instructions that, when executed, cause the computing device to determine a completion time for processing each print job sequence comprise one or more programming instructions that, when executed, cause the computing device to:
- determine a completion time associated with processing a first print job by each of the identified print production devices, wherein the first print job is a print job from the plurality of print jobs that is located at a top of the queue,
- assign the first print job to a fastest print production device, wherein the fastest print production device is a print production device from the identified plurality of print production devices that is associated with a shortest completion time for the first print job,
- determine whether the fastest print production device is the idle print production device,
- in response to determining that the fastest print production device is the idle print production device:
  - send the first print job to the fastest print production device, and
  - remove the first print job from the queue.

16. The system of claim 13, wherein the one or more programming instructions that, when executed, cause the computing device to determine a completion time for processing each print job sequence comprise one or more programming instructions that, when executed, cause the computing device to:
- determine a completion time associated with processing a first print job by each of the identified print production devices, wherein the first print job is a print job from the plurality of print jobs that is located at a top of the queue,
- assign the first print job to a fastest print production device, wherein the fastest print production device is a print production device from the identified plurality of print production devices that is associated with a shortest completion time for the first print job,
- determine whether the fastest print production device is the idle print production device,
- in response to determining that the fastest print production device is not the idle print production device:
  - determine a completion time associated with processing a next job from the queue by each of the identified print production devices that have not been assigned to a print job,
  - assign the next job to the print production device having the shortest completion time for processing the next print job, and
- repeat the determining a completion time associated with processing a next print job and the assigning the next print job to the print production device having the shortest completion time for processing the next print job until a print job from the plurality of print jobs is assigned to the idle print production device.

* * * * *